(12) United States Patent
Chen et al.

(10) Patent No.: US 11,138,010 B1
(45) Date of Patent: Oct. 5, 2021

(54) LOOP MANAGEMENT IN MULTI-PROCESSOR DATAFLOW ARCHITECTURE

(71) Applicant: International Business Machines Corporation, Armonk, NY (US)

(72) Inventors: Chia-Yu Chen, White Plains, NY (US); Jungwook Choi, Chappaqua, NY (US); Brian William Curran, Saugerties, NY (US); Bruce Fleischer, Bedford Hills, NY (US); Kailash Gopalakrishnan, New York, NY (US); Jinwook Oh, Fort Lee, NJ (US); Sunil K Shukla, Scarsdale, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/060,788

(22) Filed: Oct. 1, 2020

(51) Int. Cl.
 G06F 9/30 (2018.01)
(52) U.S. Cl.
 CPC ...... G06F 9/30065 (2013.01); G06F 9/30101 (2013.01)
(58) Field of Classification Search
 None
 See application file for complete search history.

(56) References Cited

U.S. PATENT DOCUMENTS

| 7,134,120 B2 | 11/2006 | Hammes |
| 7,290,122 B2 | 10/2007 | May et al. |
| 7,533,244 B2 | 5/2009 | Tran |
| 9,424,079 B2 | 8/2016 | Rossbach et al. |
| 9,619,229 B2 * | 4/2017 | Plotnikov ........... G06F 9/30018 |

(Continued)

OTHER PUBLICATIONS

L. Santiago, L. A. J. Marzulo, A. C. Sena, T. A. O. Alves and F. M. G. França, "Optimising loops in dynamic dataflow," in IET Circuits, Devices & Systems, vol. 11, No. 2, pp. 113-122, 3 2017.

(Continued)

Primary Examiner — Corey S Faherty
(74) Attorney, Agent, or Firm — Kurt Goudy; Lou Percello, Attorney, PLLC

(57) ABSTRACT

Embodiments of the present invention include a computer system that manages execution of one or more programs with one or more loops where each loop having a loop level. Embodiments that manage loops that can skip execution and the number of loops changing during execution are also disclosed. A loop level register (LLEV) stores the loop level for a currently executing loop. A Loop-Back Program Counter Register (LBPR) has a table of one or more Loop-Back Registers. Each Loop-Back Register stores the loop level for a LBPR respective loop and a loop back PC location for the LBPR respective loop. A Program Counter points back to the PC location for each iteration of the loop. A Loop Current Count Register table (LCCR) tracks a number of iterations remaining to executed for of the loop. A loop management process causes one of the CPUs to execute all the one or more instructions of an iteration of the currently executing program loop. When all iterations of the executing loop are complete, the LLEV is decremented to a next loop level that contained the executed loop.

20 Claims, 8 Drawing Sheets

700

| PC | BE | Instr | LLEV | actions |
|----|----|----|----|----|
| 8 | 0 | op0 | 3 | op0 |
| 9 | 0 | MVLOOP 12 | 4 | LBPR[4]←10, LCCR[4]←12 |
| 10X→ 10 | 0 | op1 | 4 | op1 |
| 11 | 0 | op2 | 4 | op2 |
| 12 | 0 | MVLOOP 4 | 5 | LBPR[5]←13, LCCR[5]←4 |
| 4X→13 | 0 | op3 | 5 | op3 |
| 14 | 1 | op4 | 5 | op4, Decr LCCR[5], PC←13 if LCCR[5]>0 |
| 15 | 1 | op5 | 4 | op5, Decr LCCR[4], PC←10 if LCCR[4]>0 |
| 16 | 0 | op6 | 3 | op6 |

(56) References Cited

U.S. PATENT DOCUMENTS

| | | |
|---|---|---|
| 10,025,566 B1 | 7/2018 | Ahmed et al. |
| 10,346,145 B2 * | 7/2019 | Zhang ................... G06F 9/325 |
| 2006/0107028 A1 * | 5/2006 | Meuwissen ......... G06F 9/30181 |
| | | 712/241 |
| 2008/0141013 A1 * | 6/2008 | Klima ................... G06F 9/325 |
| | | 712/241 |
| 2016/0019060 A1 | 1/2016 | Chatha et al. |
| 2016/0019061 A1 | 1/2016 | Chatha et al. |
| 2020/0371800 A1 * | 11/2020 | Chirca ................ G06F 9/30094 |

OTHER PUBLICATIONS

Hyesun Hong, Hyunok Oh, and Soonhoi Ha, "Hierarchical Dataflow Modeling of Iterative Applications," Proceedings of the 54th Annual Design Automation Conference 2017 (DAC '17). ACM, New York, NY, USA, Article 39, 6 pages.

* cited by examiner

| PC | BE | Instr | LLEV | actions |
|---|---|---|---|---|
| 8 | 0 | op0 | 3 | op0 |
| 9 | 0 | MVLOOP 12 | 4 | LBPR[4]←10, LCCR[4]←12 |
| 10 | 0 | op1 | 4 | op1 |
| 11 | 0 | op2 | 4 | op2 |
| 12 | 0 | MVLOOP 4 | 5 | LBPR[5]←13, LCCR[5]←4 |
| 13 | 0 | op3 | 5 | op3 |
| 14 | 1 | op4 | 5 | op4, Decr LCCR[5], PC←13 if LCCR[5]>0 |
| 15 | 1 | op5 | 4 | op5, Decr LCCR[4], PC←10 if LCCR[4]>0 |
| 16 | 0 | op6 | 3 | op6 |

| PC | BE | Instr | LLEV | actions |
|----|----|----|----|----|
| 8 | 0 | ... | 3 | assume skip[3]==0 |
| 9 | 0 | MVLOOP 0 | 4 | skip[4]←1 |
| 10 | 0 | op1 | 4 | NOP instead of op1 |
| 11 | 0 | op2 | 4 | NOP instead of op2 |
| 12 | 0 | MVLOOP 4 | 5 | skip[5]←1 |
| 13 | 0 | op3 | 5 | NOP instead of op3 |
| 14 | 1 | op4 | 5 | NOP instead of op4 |
| 15 | 1 | op5 | 4 | NOP instead of op5 |
| 16 | 0 | op6 | 3 | op6 (skip[3]==0) |

LOOP MANAGEMENT IN MULTI-PROCESSOR DATAFLOW ARCHITECTURE

BACKGROUND

The present invention relates to loop management of computer program execution. More specifically, the invention relates to managing loops during program execution without the explicit use of conditional and/or branch instructions, especially in multi-processor dataflows.

Kernels are computer programs that execute in a computer's operating system and facilitate interactions between hardware and software components of the computer. In some computer systems, a kernel executes a given unit or block of code, e.g. in a dataflow of a main program. The blocks of code (units/blocks) and the dataflows in a main program are defined by a complier. There are multiple different units/blocks in the main program and the units/blocks operate on data in different ways. Whether executing on a single processor or multi-processor system, the execution of the units/blocks must be performed in a cooperative manner for a given dataflow of the system.

Compilers split programs into multiple basic units/blocks corresponding to and within the control and dataflow of the program.

Generally, there are many loop levels within these units/blocks executed by the respective kernels. Loop levels can be i. peer loops, e.g. loops of instructions that can be executed independent from other peer loops, and ii. nested loops, e.g. loop of instructions executed within one or more higher level loops of instructions.

Some loops have one or more instructions followed by a conditional check and/or branch instruction. Often branch instructions are based on one or more outcomes of the execution of one or more previous instructions. For example, a branch or conditional instruction can direct execution to: i. one or more first functions (or a first sequence of instructions) based on the occurrence of a first outcome of one or more previous instructions or ii. one or more second functions (or second sequence of instructions) based on the occurrence of a second outcome of the previous instructions.

One common instantiation of branch/conditional instructions is to start re-execution. In re-execution, e.g. upon occurrence of a first outcome, the program execution returns to the beginning of the currently executing loop of instruction(s) to start another loop iteration. However, upon occurrence of a second outcome the program execution exits the currently executing loop. Branch/conditional instructions are very well known.

Generally, in the prior art, each of these basic units/blocks have one or more instructions followed by a conditional and a branch instruction, or alternatively, the program control/execution falls through to a succeeding basic unit/block.

Parallel computing systems, particularly parallel computing systems used in deep learning applications, have multiple kernels processing/executing units/blocks in parallel with one another. This parallel execution must be coordinated and/or integrated while the program(s) are being executed.

Managing the loop execution, particularly in parallel systems, is complex and difficult. Conventional hardware used in computer systems requires high instruction counts to manage loop executions, particularly for loops containing explicit conditional and branch instructions. This increases the number of executed instructions and execution time of the program.

There is a need to reduce instruction counts required for loop management during program execution, particularly in large parallel computing systems.

SUMMARY

Embodiments of the present invention include a computer system that manages execution of one or more programs with one or more loops where each loop has a loop level. The system includes one or more processors, one or more memories, a program counter (PC), and one or more instruction stacks. A loop level register (LLEV) stores the loop level for a currently executing loop. A currently executing loop is one of the loops in the program that one of the processors is currently executing.

A Loop-Back Program Counter Register (LBPR) is a table of one or more Loop-Back Registers. The table is indexed by loop level (LLEV). By its position in the table, a Loop-Back Register is associated with the loop level for a LBPR respective loop and contains a loop back PC location for the LBPR respective loop at that loop level. The loop back PC location is a location in the instruction stack that stores a first body instruction of the LBPR respective loop. The first body instruction is the first instruction in the instruction stack after a MVLOOP instruction associated with the LBPR respective loop.

A Loop Current Count Register table (LCCR) has one or more LCCR Registers. This table is also indexed by LLEV. By its position in the table, an LCCR Register is associated with the loop level for a LCCR respective loop and contains the number of iterations remaining to be executed for the LCCR respective loop at that loop level.

A loop management process causes one of the CPUs to execute all of the one or more instructions of an iteration of a loop level in the program. The executing program loop level is equal to the currently executing loop level stored in the LLEV.

The system can manage multiple levels of nested loops.

Embodiments include skipping execution of some (or all) loops while executing some (or none) of the other loops. Other embodiments manage dynamic loops in programs where the number of iterations of some loops change during the program execution.

Methods of operating the computer system are also disclosed.

BRIEF DESCRIPTION OF THE DRAWINGS

Various embodiments of the present invention will be described below in more detail, with reference to the accompanying drawings, now briefly described. The Figures show various apparatus, structures, and related method steps of the present invention.

FIG. 7 is a listing of various register and program counter (PC) settings and associated instruction executions for an example instruction window/stack for a static loop count.

FIG. 8 is a listing of various register and program counter (PC) settings and associated instruction executions for an example instruction window/stack with skipped loops.

DETAILED DESCRIPTION

Figure 1:
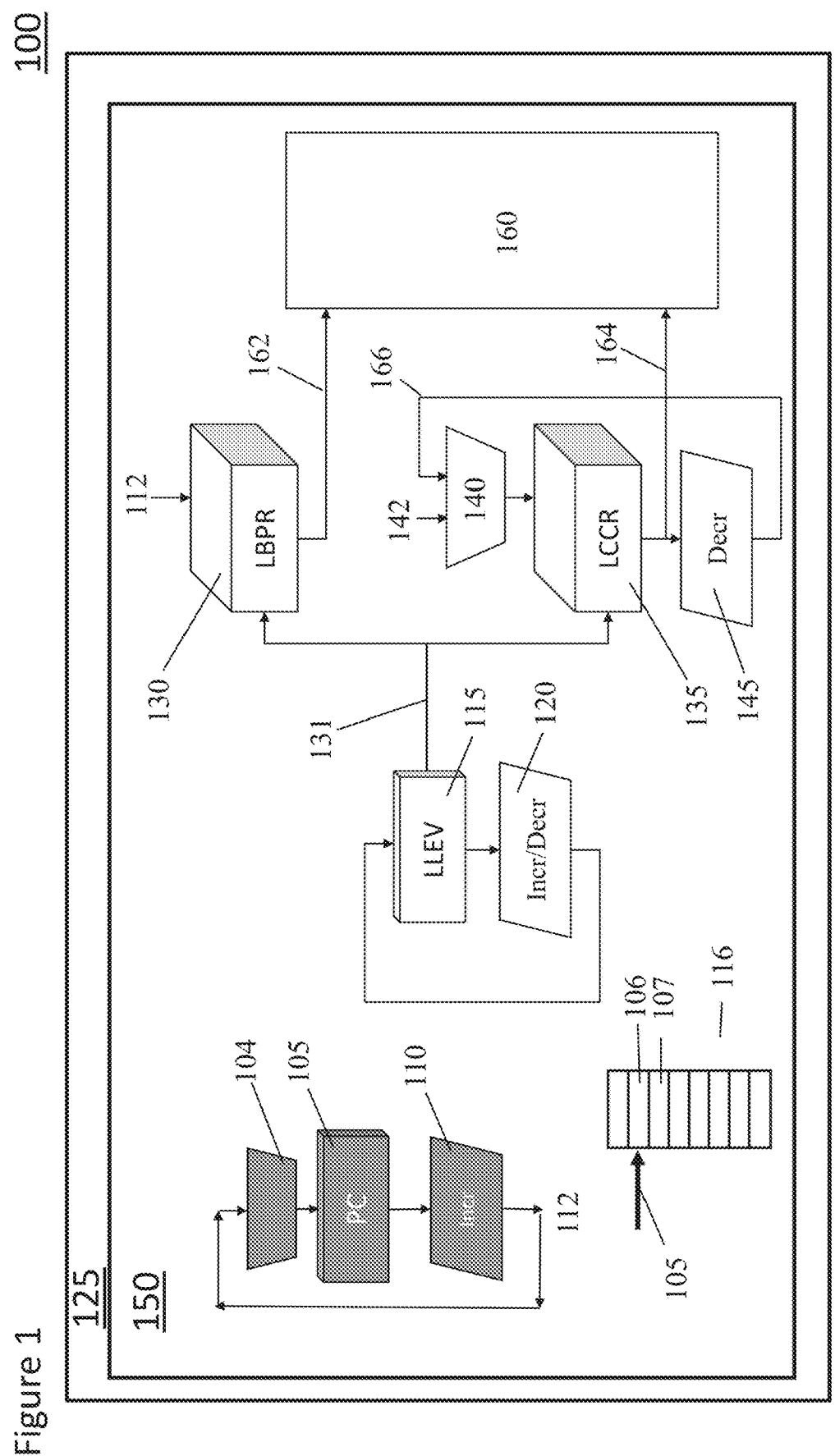
FIG. 1 is a block diagram of one embodiment of a computer system with a loop management architecture.

It is to be understood that embodiments of the present invention are not limited to the illustrative methods, apparatus, structures, systems and devices disclosed herein but instead are more broadly applicable to other alternative and broader methods, apparatus, structures, systems and devices that become evident to those skilled in the art given this disclosure.

In addition, it is to be understood that the various layers, structures, and/or regions shown in the accompanying drawings are not drawn to scale, and that one or more layers, structures, and/or regions of a type commonly used may not be explicitly shown in a given drawing. This does not imply that the layers, structures, and/or regions not explicitly shown are omitted from the actual devices.

Further, certain elements may be left out of a view for the sake of clarity and/or simplicity when explanations are not necessarily focused on such omitted elements. Moreover, the same or similar reference numbers used throughout the drawings are used to denote the same or similar features, elements, or structures, and thus, a detailed explanation of the same or similar features, elements, or structures may not be repeated for each of the drawings.

The devices, functions, structures, and methods disclosed in accordance with embodiments of the present invention can be employed in applications, hardware, and/or electronic systems. Suitable hardware and systems for implementing embodiments of the invention may include, but are not limited to, personal computers, communication networks, electronic commerce systems, portable communications devices (e.g., cell and smart phones), solid-state media storage devices, expert and artificial intelligence systems, parallel processing systems, functional circuitry, neural networks, the internet of things (IoT), etc. Other systems and hardware incorporating these devices, functions, and structures are contemplated embodiments of the invention.

It is understood that the explanation might be affected by the orientation of the device or a sequence of steps described. For example, while these descriptions might change if the device was rotated upside down or if steps were executed in a different order, the descriptions remain valid because they describe relative relationships between features of the invention.

Embodiments of the present invention include a novel computer architecture that enables a multiloop execution of programs with a minimum of software intervention. The invention has use in Central Processing Units (CPUs), Graphical Processing Units (GPUs), cores, virtual machines, etc. Embodiments of the invention are easily implemented in parallel processing systems. The functions described below can be implemented in hardware and/or software.

Some features of the present invention can be embodied in the instruction fetch and decode stage of the pipeline managing the Program Counter (PC) and loop count for loop execution.

The present invention has a novel and efficient hardware structure, architecture, and process design for loop implementation which reduces overhead of instruction execution and can be implemented to easily modify conventional loop management functions.

FIG. 1 is a block diagram of one embodiment of a computer system 100 with a loop management architecture 100. The computer system and architecture 100 can function with a single processor or multiple processors operating in parallel, e.g. a parallel processing computer system. For example, the system/architecture 100 can have one or more computers 125 multi-processing.

The system/architecture 100 executes one or more main programs containing one or more loops with a static loop count. A main program has a static loop count when the number of loops in the main program and the number of iterations of those loops is known prior to execution, and the number of loops and iterations does not change during the execution of the entire main program.

The computers 125 can be any computer system instantiation (e.g. one or more general-purpose computers, microcomputers, controllers, pervasive devices, etc.) with one or more memories, one or more operating systems, one or more network connections (e.g., Internet, intranets, local area networks and/or clouds connected by network buses, radio links, fiber optics, etc.), and/or one or more input/output (I/O) functions. The computers 125 can have one or more processors 150 (e.g. CPUs 150) and/or coprocessors 150 (e.g. math coprocessors, Graphical Processing Units, GPUs, etc. 150), and/or cores 150 working in parallel or separately. The computers 125 can also be virtual machines.

Each of the processors 150 has one or more known Program Counters (PC) 105 with a known incrementing function 110 that increments 112 the PC 105 to enable fetching of an instruction 106 from an instruction window/stack 116. The instruction stack has multiple instruction stack registers 106/107 that store instructions.

The PC 105 points to one of the registers 106 that holds the currently executing instruction 106. When the PC 105 increments, the PC 105 points to the next-to-be-executed instruction 107 in the instruction stack 116, which then becomes the currently executing instruction 106. PC's 105, incrementing PC's 110/112, and instruction stacks 116 are well known.

The incrementing function 110 increments 112 the PC 105 through a known multiplexing function 104 to point from the currently executing instruction 106 to the next-to-be-executed 107 instruction in the instruction window/stack 116. If the PC 105 is incremented by 1, the next-to-be-executed instruction 107 is the instruction next in sequence in the instruction window/stack 116. However, by changing the value in the PC 105, instructions in the instruction window/stack 116 can be executed in an order different than that sequence the instructions are stored in the instruction window/stack 116.

In the present invention, functions/processes are added to the processor 150 to manage execution of software (e.g. main programs) with multiple loops and levels of loops in the dataflow of the main program(s).

Units/blocks of code executed by a kernel can contain multiple loops. Loops have levels in the data flow of the program. As stated, peer loops are loops of instructions that can be executed independent from other peer loops. However, nested loops are loops of instructions executed within one or more other loops.

As a non-limiting example in this disclosure, loops with a higher loop level number [i] are nested and executed within a loop with a lower loop level number [i−1].

At times in the data flow, control (e.g. instruction execution) is passed from a lower-level loop to a higher-level loop and vice versa. When one or more of the higher-level loops completes execution, e.g. in the prior art upon encountering a branch instruction, control in the data flow is passed to another loop, e.g. back to the lower-level loop.

The present invention adds new processor functions (in hardware and/or software) and methods of operation to manage loop execution without branch or conditional branch instructions.

A Loop LEVel (LLEV) 115 is a loop level register (in some embodiments a single register) that stores information about the loop/nesting level of the currently execution loop. The LLEV 115 works with an incrementor/decrementor function 120 that keeps the currently executing loop level (or nesting level) in the LLEV 115 current by incrementing or decrementing the nesting level stored in the LLEV 115 as control (instruction execution) passes from one loop to another.

A currenting executing loop/nesting level is stored in the LLEV 115 and is read 131 by the LBPR 130 and the LCCR 135. In some embodiments, there are 16 nesting levels, one of which is stored and updated in the LLEV 115 as the program executes.

The Loop-Back Program Counter Registers (LBPR) 130 is a table of Loop-Back registers, LBPR[i], 130, where "i" is a nesting level, that each hold the PC 105 location in the instruction stack 116 of the first instruction in a loop body of a given loop/nesting level, [i] or loop. The PC location of the first instruction in the loop body, or "loop back PC location" is the PC 105 location of the first instruction in the given loop level [i] after a MVLOOP instruction associated with the loop, i.e. a first body instruction.

The MVLOOP instruction is a novel instruction at the beginning of each loop and is described in more detail below.

The Loop Current Count Registers (LCCR) 135 is a table of Loop Count Registers, LCCR[i] 135, that each hold the number of iterations remaining in the execution of the respective loop level [i].

In some embodiments, there are 16 entries in the LCCR 135, accounting for 16 loop levels and the associated iterations remaining for each loop level, [i].

The LCCR 135 works with a decrementer 145 and a multiplexer 140. When the execution of a given loop, LLEV, begins, the multiplexer 140 selects the number of times the main program requires the given loop/loop level, LLEV, to be executed 142. The decrementer 145 decrements the value of LCCR[i] by 1 each time an execution of the given loop, LLEV, is completed, i.e. one loop iteration is completed. The multiplexer 140 then selects the decremented value 166 and updates, e.g. decrements, the LCCR 135 to store the number of remaining iterations for the given loop, LLEV, being executed.

Accordingly, the LCCR 135 is a set of LCCR [i] registers, where each LCCR [i] register has a loop level [i] and the number of remaining iterations for each respective loop level LLEV.

The initial count 142 is the total number of iterations of the particular loop level, LLEV, that is required by the executing program. In some embodiments, the initial iteration count 142 for a given loop level, LLEV, is indicated in a field in the MVLOOP instruction for the loop.

In some embodiments, the loop back PC location 162 for a given currently executing loop level LLEV and the number of iterations remaining 164 for the currently execution loop level LLEV, is available to instruction processing logic 160. The instruction processing logic 160 contains one or more of the processes described below and/or other processing logic 160, as needed.

Figure 2:
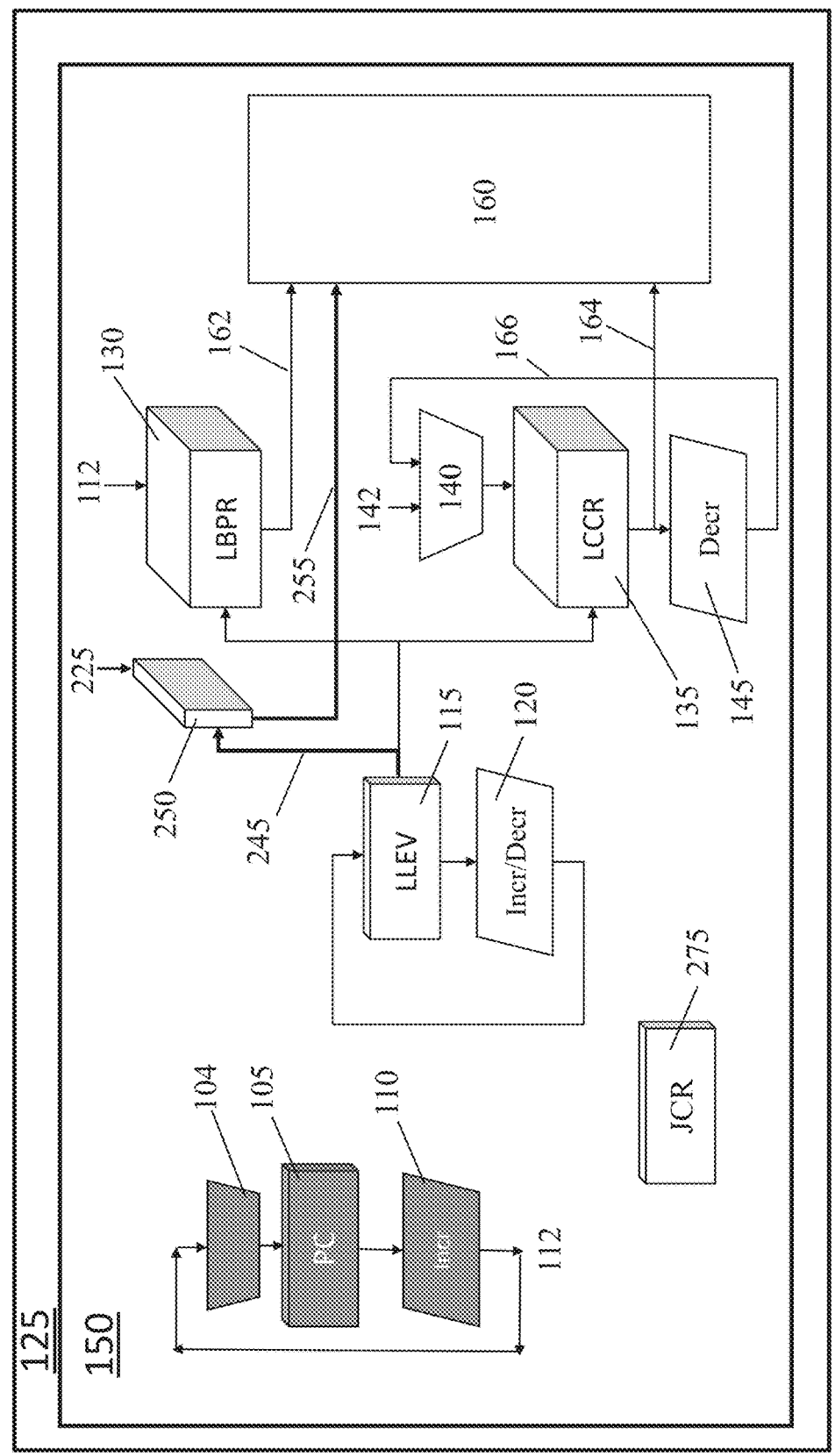
FIG. 2 is a block diagram of alternative embodiment of a computer system with a loop management architecture that enables one or more loops to skip execution.

FIG. 2 is a block diagram of alternative embodiment of a computer system/architecture 200 with a loop management architecture that enables one or more loops to skip execution. This computer system/architecture 200 manages main programs with a static loop count.

However, with the addition of the JCR registers 275 and system processes (shown in FIG. 6), the system/architecture 200 can manage loop execution with a dynamic loop count, as described below.

The system/architecture 200 can execute one or more main programs without branch and/or conditional branch instructions. The skip level function 250 enables the execution of one or more loops and the skipping (non-execution) of one or more other loops.

A skip level function 250 determines if one or more loop levels [i] should be skipped, i.e. not executed. Accordingly, when a loop level [i] is skipped, none of the instructions in the skipped loop level [i] are executed. In addition, none of the instructions in any loop level [i] nested within the skipped loop level [i] also are not executed. In this example, these nested loop levels have a higher loop level [i] than the skipped loop level and are executed within the skipped loop level.

In some embodiments, the skip level function 250 uses a skip execution table 250 of bits. If a bit, e.g. Skip[i], associated with a skipped loop level [i], is set to a particular value, e.g. 1, the instructions in skipped loop level [i] are not executed and the instructions of all the loop levels nested within the skipped loop level [i] are not executed, as well.

The Skip[i] are set by a table input 225. In some embodiments, the value of the Skip[i] is obtained from a value of a SkipBit field in the MVLOOP instruction. The MVLOOP instruction for each loop level [i] in the main program can have a SkipBit field (and associated value).

Each Skip Bit [i] is read into 225 a Skip Table 250. The Skip Table 250 has one or more Skip Bit Registers, one for each loop level [i]. A Skip Bit [i] value is stored in the Skip Bit Register [i] for each of the respective loop levels [i].

One use of the skip function 250 can customize the use and/or execution of standard or template main programs. A main program can have a fixed number of loop levels [i]. The main program can be customized into multiple instantiations by determining which loop levels [i] are executed which levels are skipped, i.e. not executed, in one or more of the instantiations.

A skip process reads the current loop level [i] 245 from the LLEV 115. If the Skip Bit Register [i] has a Skip Bit [i] value indicating that the current loop level [i] should be skipped (not executed), a skip signal 255 is sent to the new instruction processing logic 160 and/or decision point 410 below. See description of FIGS. 4 and 5 below.

The Jump Control Register (JCR) 275 enables execution of main programs with dynamic loop counts, i.e. where the number of loops and the number of iterations of some loops change during the execution of the main program. In these embodiments, the number of loops required to execute the main program is not known a prior to the execution of the main program.

In some embodiments, the JCR 275 is a table of one or more JCR registers, JCR [idx](not shown). See the description of FIG. 6 below. In some embodiments, values for the index into the JCR 275 (idx) and a target instruction location (PC Tgt) are given in the MVLOOP instruction. In some embodiments, a JCR register JCR [idx] holds a loop count determined during program execution.

FIGS. 3 through 6 are alternative embodiments of processes that are used in combination with the hardware/software functions described in FIGS. 1 and 2 to execute multiple nested loops in main software program execution. The main program can be executed by a single processor or multiple processors operating in parallel without needing comparison or conditional branch instructions in the instruction set of the computer system 100/200.

Figure 3:
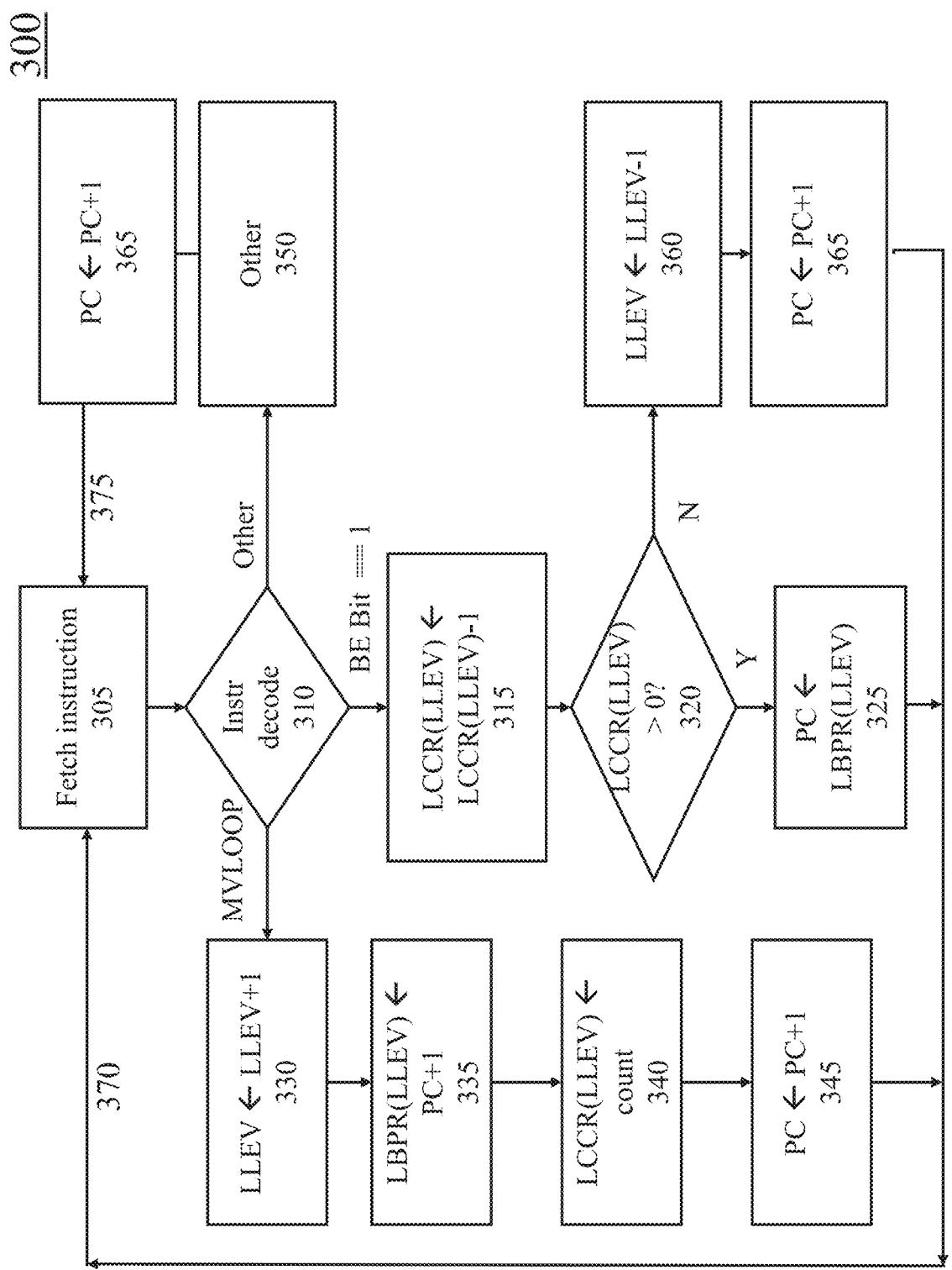
FIG. 3 is a flow chart of a loop management process showing the steps of setting up functions in the loop management architecture to start, execute, and end one or more loops.

FIG. 3 is a flow chart showing the steps of a process 300 for setting up functions in the loop management architecture to start, execute, and end one or more loops.

The process 300 can execute a main program with multiple nested loops where there is a static loop count, i.e. the number of loops in the main program does not change during execution of the main program.

Process 300 begins with the system 150 fetching an instruction in step 305 from the instruction stack 116 using program counter 105.

The instruction is decoded in step 310.

If the instruction is a MVLOOP instruction, control passes to block 330. If a BE bit in the decoded instruction has a certain value, e.g. the BE bit set to 1, control passes to block 315. If the decoded instruction (e.g. 106) is not a MVLOOP instruction and the BE bit in the instruction is not set to indicate a last instruction in the loop or the loop ending (e.g. equal BE=1), the instruction is processed by other known processes 350.

The MVLOOP instruction, or a MoVe LOOP COUNT instruction, is an instruction in the system instruction set that indicates the program execution is being passed to a loop at a next nesting or loop level, [i]. Accordingly, the MVLOOP instruction indicates a loop, with a loop level LLEV+1, is starting.

In some embodiments, the MVLOOP instruction has one or more of the following fields: a MVLOOP operation code (op code), an initial iteration count 142, a Skip Bit Field [i](with a Skip Bit [i] value) for the given loop level [i], and static/dynamic field (determining whether the loop is static or dynamic). In some embodiments, e.g. where the loop count is dynamic during the program execution, the MVLOOP instruction can have fields containing one or more JCR indexes (idx and/or an associated PC Tgt location).

A BE, i.e. a "Bit loop End", is a field in any given instruction. The BE field in an instruction is set to a particular value, e.g. set equal to 1, when the instruction is the last instruction in a loop. For example, an instruction with a BE bit value of 1 indicates that all instructions in a loop have been executed. In some embodiments, the instruction containing the BE indicating a last instruction cannot be a MVLOOP instruction.

When the decoder 310 determines that an instruction is a MVLOOP instruction, step 330 of the process 300 causes the increment/decrement function 120 to increment the value LLEV in the LLEV 115 by 1 to indicate the loop level [i] has changed, e.g. to a higher level, and a nested loop is being processed.

Step 335 increments 112 the program counter (PC) 105 by 1 so the LBPR stores the loop back PC 105 location for the loop level [i]—the PC 105 location of the first instruction in the given loop level [i] after the MVLOOP instruction for the loop.

Step 340 of the process 300 puts the initial iteration count 142 (the number of instructions in the new, e.g. nested, loop level) into the multiplexer 140.

Step 345 of process 300 increments the PC 105 and control is passed back 370 to fetch the next instruction 305.

As long as the next fetched 305 instruction does not have a BE bit indicating a last instruction and the instruction is not a MVLOOP instruction, the next fetched 305 instruction is processed as any other instruction would be 350. The PC 105 is incremented 365 and a next instruction is fetched 305.

This execution continues until the last instruction in the loop level [i] is reached, (as indicated by the value of BE in the last instruction) and then control is passed to step 315. Because the value of the BE bit indicates the last instruction in the loop, at this point all the instructions in the loop level [i] are executed, e.g. one iteration of the loop is completed, before control passes to step 315.

Step 315 decrements 145 the iteration count and the multiplexer 140 selects the decremented value 166 to update the LCCR 135.

Step 320 checks the number of iterations remaining 164 in the LCCR 135 for the currently execution loop level LLEV 115.

If there are a number of iterations 164 remaining, e.g. the number of iterations remaining 164 is greater than zero, step 325 changes the PC 105 to point to the loop back PC location 162 stored in the LBPR 130, e.g. copies the location of the loop back PC location 162 into the PC 105. Control is returned 370 to fetch the next instruction 305 and the loop level [i] is re-executed. Note that in this embodiment, the MVLOOP instruction in the loop level [i] is not re-executed when the loop level [i] is re-executed.

If the check in step 320 finds there are no iterations for the loop level [i] remaining, control passes to step 360.

Step 360 decrements the LLEV to indicate a next lower loop (the loop level containing the just executed nested loop) is being processed, i.e. the currently executing loop.

Step 365 increments the PC 105 and control is passed 370 to fetch 305 the next instruction in the instruction stack 116. This instruction is out of the nested loop that just executed/re-executed the number of times required by the initial iteration count 142.

Figure 4:
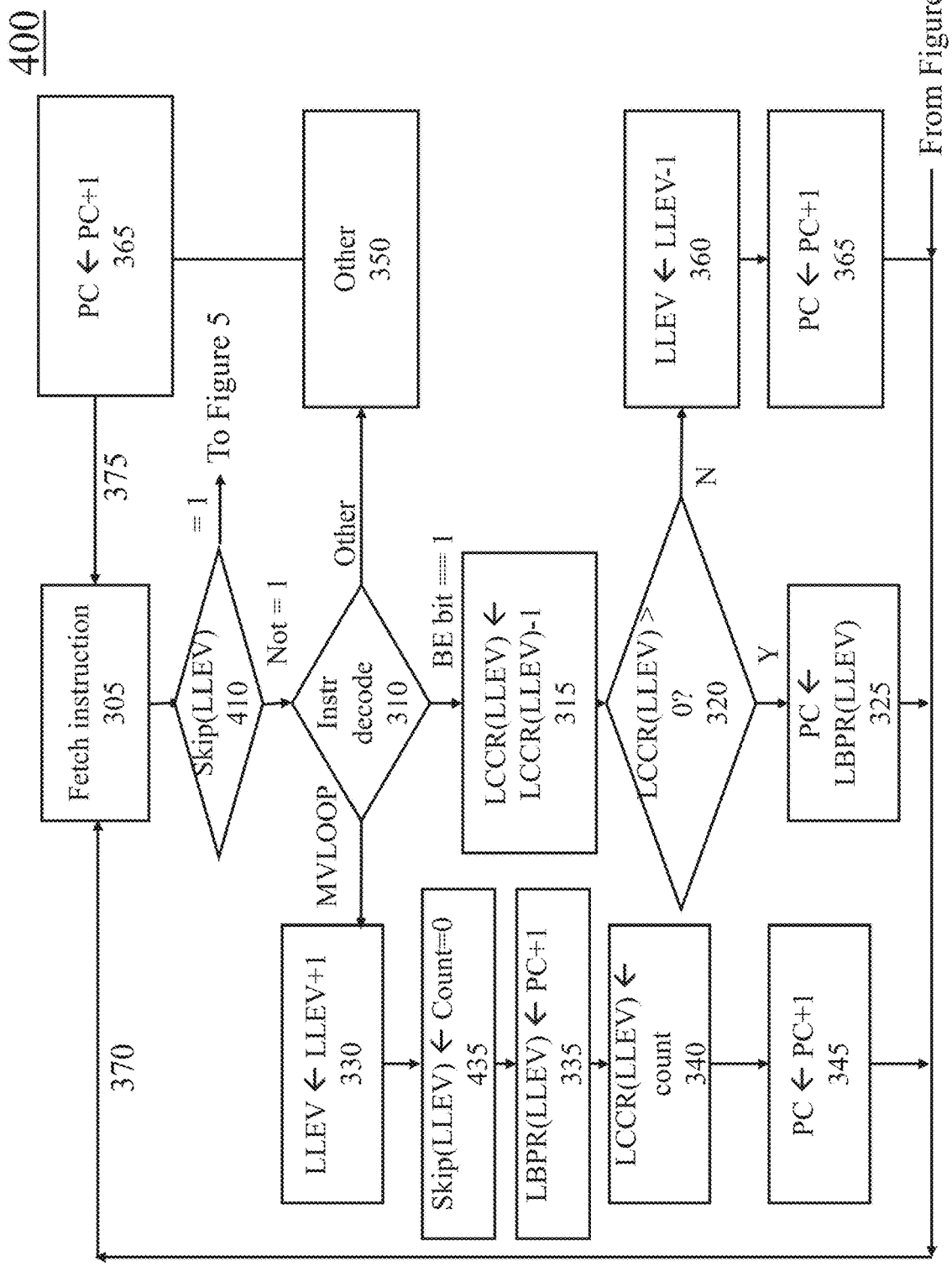
FIG. 4 is a flow chart of a loop management process showing the steps of setting up functions in the loop management architecture to start, execute, and end some loops and skip execution of other loops.

FIG. 4 is a flow chart skip process 400 showing the steps of setting up functions in the loop management architecture to start, execute, and end some loops and skip execution of other loops.

Additional steps are added to process 300 to enable the skip process 400.

Step 410 checks whether the current loop level (LLEV) is being skipped by checking Skip Bit [LLEV].

Figure 5:
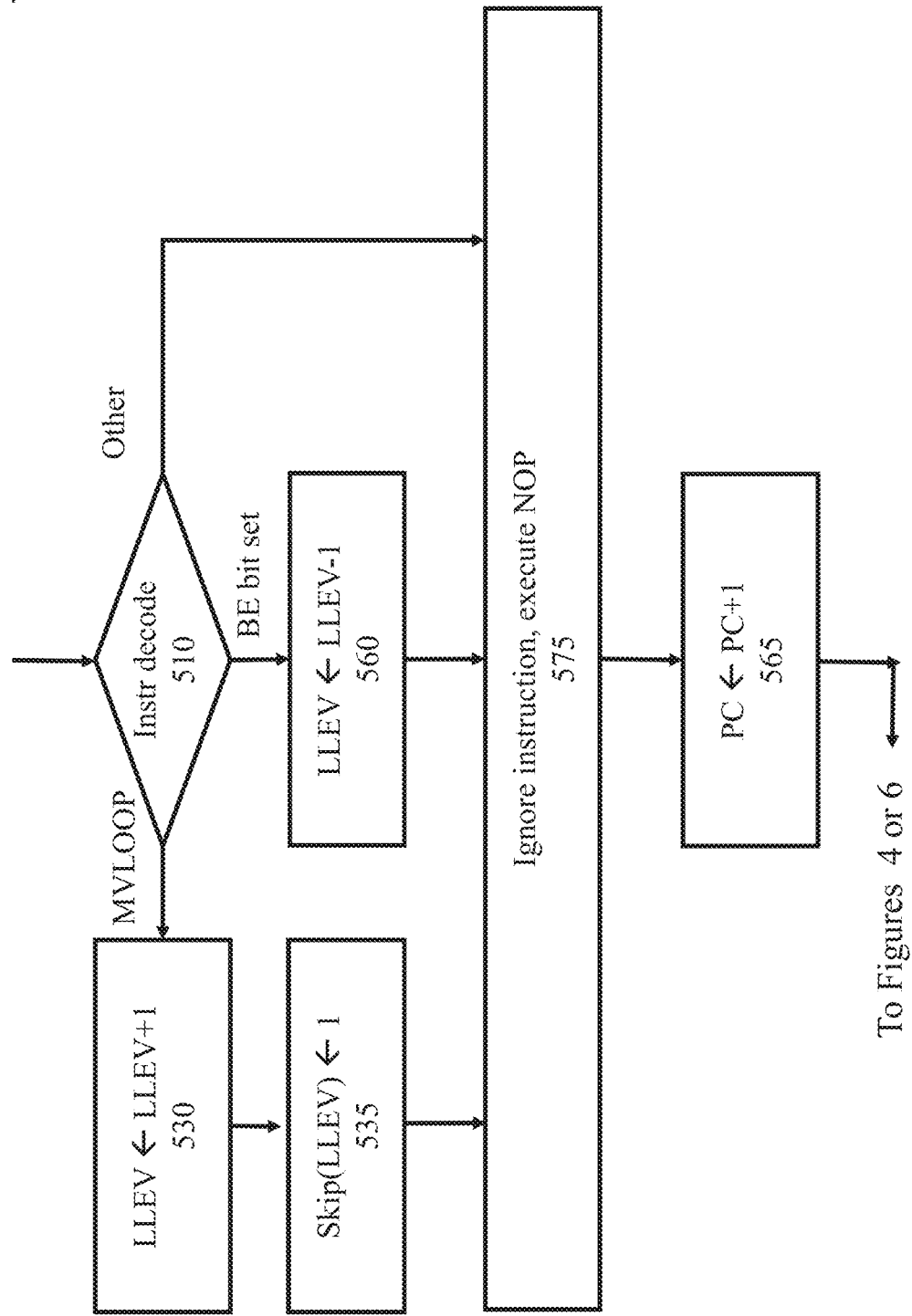
FIG. 5 is a flow chart showing the steps of a skip level process for managing loop levels and instruction execution when one or more loop levels are skipped.

If the Skip Bit [LLEV] is set to skip the loop, e.g. set to a value of 1, process 500 described in FIG. 5 is executed and control is returned 370 to fetch 305 the next instruction after the PC 105 is incremented.

Process 500 does not execute any instruction in the skipped current loop level and sets the Skip Bit [i+1] in each nested loop in the skipped current loop level, [i], to be skipped as well.

Refer to FIG. 5.

FIG. 5 is a flow chart showing the steps of a part 500 of the skip level process 400 for managing loop levels, nested loops, and instruction execution when one or more loop levels are skipped.

Step 510 decodes the next instruction in the skipped current loop level [i]. If the decoded 510 instruction is not a MVLOOP (e.g. for a nested loop) instruction and is not the last instruction in the skipped current loop level [i], the instruction execution is passed to step 575 where it is ignored. For example, the instruction in the skipped current loop level [i] is not executed, e.g. by an "no operation" instruction (NOP). The PC 105 is incremented 565 and control is passed back 370 to the fetch step 305 in process 400 (or process 600 for programs with dynamic loop counts as described in FIG. 6).

If the next instruction in the skipped current loop level [i] is decoded 510 and has a BE bit value indicating the last instruction in the skipped current loop level [i], the LLEV 115 is decremented 560 to a lower loop level (to a loop in which the skipped current loop level is nested), and the last instruction (with the BE bit value set) is not executed 575.

If the next instruction in the skipped current loop level [i] is decoded as an MVLOOP instruction, the LLEV 115 is incremented (to a higher level indicating a nested loop) and the Skip Bit for this nested loop [i+1] is set to indicate the instructions in this nested loop will also not be executed. In this manner, process 500 iterates to ensure instructions in all the loop levels nested within (e.g., having a higher LLEV level than) the skipped current loop level [i] will not be executed.

Return back to FIG. 4.

If the last instruction was not reached for the skipped current loop level [i] in process 500, an instruction in this skipped current loop level [i] that is fetched 305 will be directed again to process 500 by step 410 and not executed.

If the last instruction of the skipped current loop level [i] was processed by process 500, the loop level is decremented [i−1]. If the new current loop level [i−1] is not skipped, the next fetched instruction 305 will be out of the skipped loop level, e.g. control passes to step 310.

If a MVLOOP instruction is fetched 305 and is not in a loop with a set Skip Bit, the MVLOOP is processed by step 330, as described above and processing is transferred to steps 435, 335, 340, 345. Step 435 determines whether execution of this nested loop should be skipped, e.g. by setting the Skip Bit value. If the count field of the MVLOOP instruction is 0, so no iterations should be executed, the skip bit for the new level, Skip (LLEV) is set, e.g. to 1, to indicate that instructions should be skipped. If the count field of the MVLOOP instruction is greater than 0, the body of the loop should be executed at least once, and the skip bit Skip (LLEV) is set, e.g. to 0, to indicate that instructions should be decoded in step 310.

Steps 335, 340, and 345 are performed as described above.

Figure 6:
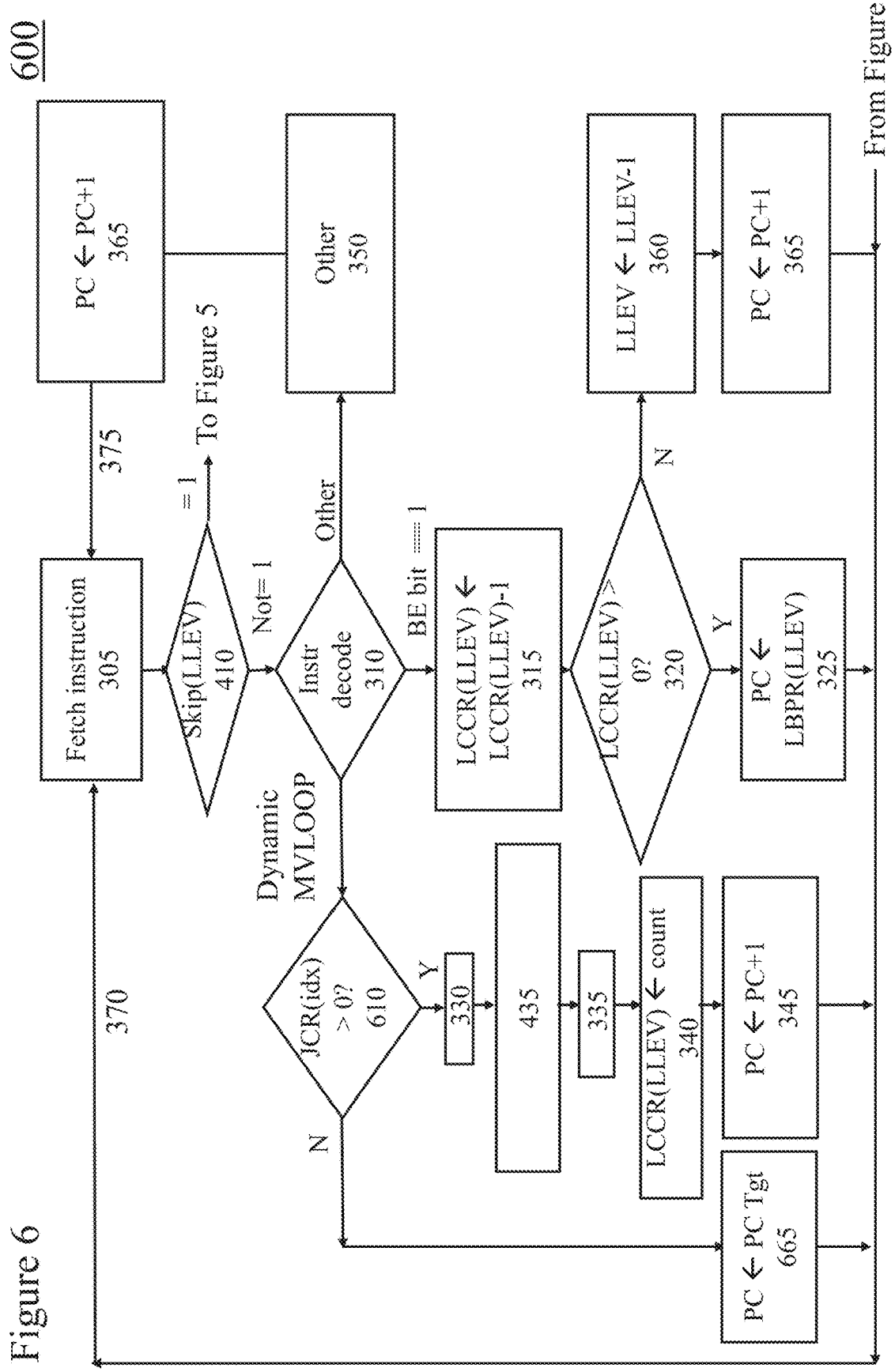
FIG. 6 is a flow chart a dynamic loop management process showing the steps of setting up functions in a loop management system/architecture when loops are dynamically executed, or not, during the execution of the main program.

FIG. 6 is a flow chart showing the steps a dynamic loop count process 600 that sets up functions in a loop management system/architecture when loops are dynamically executed, or not, during the execution of the main program.

The dynamic loop count process 600 executes main programs where the number of loops and loop iteration counts are unknown a priori to program execution but instead is determined during execution. Process 600 is process 400 with some additional functions.

In process 600, if an instruction is decoded 310 as a Dynamic MVLOOP instruction, control is passed to step 610.

In some embodiments, step 310 determines the instruction is a MVLOOP instruction, e.g. by examining the operation code. Further, the instruction is determined as a Dynamic MVLOOP instruction by examining one of the fields of the MVLOOP instruction, e.g. the Dynamic field.

In some embodiments, the JCR 275 is a table of one or more JCR registers (not shown). Each JCR register is associated with an index (idx) and its value JCR (idx) is an iteration count to be used by a MVLOOP specifying that JCR register.

In some embodiments, there are 16 JCR registers.

The index idx is specified by a field of the MVLOOP instruction creating the loop. Accordingly, the respective MVLOOP instruction determines which JCR register, hence what iteration count, is selected and used by the loop. The JCR values (iteration counts) contained by the JCR registers are dynamically determined during the execution of the main program, e.g. by one or more calculations.

If the Dynamic MVLOOP instruction is decoded 310 and the JCR value (iteration count) JCR (idx) equals 0, the loop should not be executed. The MVLOOP instruction may contain a PC Tgt field, which is the location of the instruction following the loop, and the PC 105 is loaded with PC Tgt in step 665.

If decoding Dynamic MVLOOP instruction reveals a positive value of JCR (idx), that JCR value is the starting iteration count (count) for the loop, step 330 increments the LLEV 115, e.g. treating the loop created by the Dynamic MVLOOP as a nested loop.

Step 435 sets the Skip Bit value in loop level containing the Dynamic MVLOOP to execute, so the Dynamic MVLOOP is executed. For example, step 435 performs: Skip (LLEV)←(count==0). Since count is greater than 0, (count==0) is false and Skip (LLEV)=false.

Steps 335, 340, and 345 are executed as described above. In step 340, note that the value count assigned to LCCR (LLEV) is the dynamic iteration count from JCR(idx), not a field in the MVLOOP instruction.

FIG. 7 is a listing 700 of various register and program counter (PC) settings and associated instruction executions for an example instruction window/stack for a static loop count.

This non-limiting example starts with the instruction located when the PC 105 points to location 8 in the instruction stack 116. The instruction has an operation code (i.e. op code) decoding 310 the instruction as an "op0". The action that the CPU executes 350 is "op0". The instruction is in loop level 3 (the value [i] stored in the LLEV 115 is i=3) and is not the last instruction in loop level 3 because BE is equal to 0. The PC 105 increments 365 and control passes 375 to fetch 135 the next instruction.

The next instruction located when the PC 105 points to location 9 in the instruction stack 116. The instruction is decoded as a MVLOOP 12 instruction, i.e. a MVLOOP instruction with the count field equal to 12. The LLEV 115 is incremented 120 to establish a nested loop with a LLEV with a loop level of 4, e.g. i=4. The instruction includes the initial count 142 read into the counter 140 as 12 times and the LCCR [4]register 135 for loop level 4 is set to 12 (count). The loop back PC location 162, the next instruction after the MVLOOP12 instruction, is stored in the LBPR [4] register 130, i.e. the PC will be pointed to location 10 to start a next iteration. BE is equal to 0, so the instruction is not (and in some embodiments, cannot be) the last instruction in loop level 4. The PC 105 increments and control passed 370 to fetch 135 the next instruction where the PC 105 points at location 10 in the instruction stack 116.

The instruction at location 10 in the instruction stack 116 is fetched 305 and decoded 310 as an "op1" instruction, is not the last instruction in loop level 4 (BE=0) and is executed 350. The PC 105 increments 365 and control passes 375.

The instruction at location 11 in the instruction stack 116 is fetched 305 and decoded 310 as an "op2" instruction, is not the last instruction in loop level 4 (BE=0) and is executed 350. The PC 105 increments 365 and control passes 375.

The instruction at location 12 in the instruction stack 116 is fetched 305 and decoded 310 as a MVLOOP 4 instruction that creates another nested loop level, where [i]=5. The instruction is not the last instruction in loop level 5 (BE=0).

The instruction (at location 12) includes the initial count read 142 into the counter 140 as 4 times and the LCCR [5] register 135 for loop level 5 is set to 4. The loop back PC location 162, the next instruction after the MVLOOP4 instruction, is stored in the LBPR 130, i.e. the PC location of 13 is stored in the LBPR [5] register 130.

The instruction at location 13 in the instruction stack 116 is fetched 305 and decoded 310 as an "op3" instruction, is not the last instruction in loop level 5 (BE=0) and is executed 350. The PC 105 increments 365 and control passes 375.

The instruction at location 14 in the instruction stack 116 is fetched 305 and decoded 310 as an "op4" instruction and is executed 350.

This instruction is the last instruction in loop level 5 (BE=1). The LCCR [5] decrements 145/166/140. Step 320 determines if there are any number of iterations remaining 164.

If there are one or more number of iterations remaining 164, the PC 105 is set to point to the loop back PC location 162 for loop level 5. Since LBPR [5] is 13, the PC 105 is set to location 13 in the instruction stack 116.

If there are no more iterations remaining 164, step 360 decrements the loop level LLEV 115 from 5 to 4. At this point the nested loop level where [i]=5 completed all 4 required iterations and control falls to the loop [i=4] that contained this nested loop [i=5]. The PC 105 increments 365 and control passes 370.

The instruction at location 15 in the instruction stack 116 is fetched 305 and decoded 310 as an "op5" instruction and is executed 350.

This instruction is the last instruction in loop level 4 (BE=1). The LCCR [4] decrements 145/166/140. Step 320 determines if there are any number of iterations remaining 164 for loop level [i=4].

If there are one or more number of iterations remaining 164, the PC 105 is set to point to the loop back PC location 162 for loop level 4, i.e. LBPR [4]. Since LBPR [4] is 10, the PC 105 is set to location 10 in the instruction stack 116.

If there are no more iterations remaining 164, step 360 decrements the loop level 115 from LLEV [4] to LLEV [3]. At this point the nested loop level where [i]=4 completed all 10 required iterations and control falls to the loop [i=3] that contained this nested loop [i=4]. The PC 105 increments 365 and control passes 370.

The instruction at location 16 in the instruction stack 116 is fetched 305 and decoded 310 as an "op6" instruction and is executed 350. This instruction is not the last instruction in loop level 3 (BE=0). The PC 105 increments 365 and control passes 375.

In summary, in this example, op1, op2, and op5 execute 10 times (in an "outer nested loop", where i=4); op3 and op4 are executed 40 times (being in an "inner nested loop", where i=5); and op6 executes once, being in a loop 3 with no initial loop count shown.

FIG. 8 is a listing 800 of various register and program counter (PC) settings and associated instruction executions for an example instruction window/stack with skipped loops.

In this non-limiting example, except for the MVLOOP instructions and the Skip Bit values, basically all the same instructions (op codes) are sequenced in the instruction stack 116 at the same PC 105 pointed to locations. In addition, the BE bit is the same in each instruction, indicating whether the respective instruction is last in the respective loop or not.

The example starts with the PC 105 pointing to location 8 in the instruction stack 116 where an instruction is in a loop level, LLEV [3] with Skip Bit, Skip Bit [3], indicating not to skip the LLEV [3] loop. The PC 105 increments and control passes 370.

The PC 105 points to the next instruction located at location 9 in the instruction stack 116. The instruction is decoded as a MVLOOP 0 instruction, i.e. a MVLOOP instruction with the count field equal to 0. The LLEV 115 is incremented 120 to establish a nested loop with a LLEV loop level of 4, e.g. i=4.

In step 435 of FIG. 4, since count=0, Skip (LLEV) or Skip(4) is set to true (1). The PC 105 increments and control passes 370.

The PC points to the next instruction located at location 10 in the instruction stack 116. The Skip Bit is checked at step 410 and control is passed to process 500. The instruction is decoded 510 and replaced with a NOP 575, instead of executing an op. The PC 105 increments 565 and control passes 370.

The PC points to the next instruction located at location 11 in the instruction stack 116. The Skip Bit is checked at step 410 and control is passed to process 500. The instruction is decoded 510 and replaced with a NOP 575, instead of executing an op2. The PC 105 increments 565 and control passes 370.

The next instruction at instruction stack 116 location 12 is a MVLOOP 4 instruction with a count field equal to 4. However, the loop level [i=5] created by this MVLOOP instruction will not be executed because it is a nested loop within a skipped loop, skip [4].

The Skip Bit [4] is checked at step 410 and control is passed to process 500 so the MVLOOP instruction is not decoded in step 310

The MVLOOP4 instruction is decoded 510 as a MVLOOP instruction and step 530 increments the LLEV 115. The Skip Bit in the MVLOOP4 instruction is set to skip, e.g. set equal to 1, in step 535. Now the loop level [5] has a Skip Bit [5] set to "skip". The MVLOOP 4 instruction is replaced with a NOP 575, the PC 105 increments 565, and control passes 370.

The PC points to the next instruction located at location 13 in the instruction stack 116 that is fetched 305. Step 410 checks the Skip Bit [5] and passes control to process 500. Step 510 decodes the "op3" instruction and step 575 replaces the instruction with a NOP, instead of executing the op3 instruction. The PC 105 increments 565 and control passes 370.

The PC points to the next instruction located at location 14 in the instruction stack 116 that is fetched 305. Step 410 checks the Skip Bit [5] and passes control to process 500. Step 510 decodes the "op4" instruction and determines that it is that last instruction in LLEV [5]. Step 560 decrements the LLEV 115, i.e. from LLEV [5] to LLEV [4]. Step 575 replaces the instruction with a NOP, instead of executing the op4 instruction. This ends loop level [5]. The PC 105 increments 565 and control passes 370, now within loop level [4].

The PC points to the next instruction located at location 15 in the instruction stack 116 that is fetched 305. Step 410 checks the Skip Bit [4], determines to skip loop level [4], and passes control to process 500. Step 510 decodes the "op5" instruction and determines that it is that last instruction in LLEV [4]. Step 560 decrements the LLEV 115, i.e. from LLEV [4] to LLEV [3]. Step 575 replaces the instruction with a NOP, instead of executing the op5 instruction. This ends loop level [4]. The PC 105 increments 565 and control passes 370, now within loop level [3].

The PC points to the next instruction located at location 16 in the instruction stack 116. This instruction is fetched 305. Step 410 checks the Skip Bit [3], which is 0, and the instruction is not skipped.

Step 310 decodes the instruction as an "op6" instruction and that the instruction is not the last instruction in loop level 3 (BE=0). The op6 instruction is executed 350. The PC 105 increments 365 and control passes 375.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein was chosen to explain the principles of the embodiments and the practical application or technical improvement over technologies found in the marketplace or to otherwise enable others of ordinary skill in the art to understand the embodiments disclosed herein. Devices, components, elements, features, functions, apparatus, systems, structures, techniques, and methods described with different terminology that perform substantially the same function, work in the substantial the same way, have substantially the same use, and/or perform the similar steps are contemplated as embodiments of this invention.

We claim:

1. A computer system that manages execution of one or more programs with one or more loops, each loop having a loop level, the system comprising:
   one or more processors and one or more memories;
   a program counter (PC);
   one or more instruction stacks, each instruction stack having a plurality of instructions stored in one or more of the memories;
   a loop level register (LLEV) that stores the loop level for a currently executing loop, the currently executing loop being one of the loops that one of the processors is currently executing;
   a Loop-Back Program Counter Register (LBPR), the LBPR being a table of one or more Loop-Back Registers, each Loop-Back Register indexed by the loop level for a LBPR respective loop and storing a loop back PC location for the LBPR respective loop, the loop back PC location being a location in the instruction stack that stores a first body instruction of the LBPR respective loop, the first body instruction being the first instruction in the instruction stack after a MVLOOP associated with the LBPR respective loop;
   a Loop Current Count Register table (LCCR), the LCCR having one or more LCCR Registers, each LCCR Register indexed by the loop level for a LCCR respective loop and storing a number of iterations remaining to executed for the LCCR respective loop; and
   a loop management process that causes one of the CPUs to execute all of the one or more instructions of an iteration of a program loop that has a program loop level equal to the currently executing loop level stored in the LLEV.

2. The system, as in claim 1, where the PC is incremented after execution of each of the instructions and a next instruction is fetched from the instruction stack, decoded, and executed.

3. The system, as in claim 1, where the loop management process performs the following steps:
   incrementing the PC after execution of each of the instructions;
   fetching a next instruction from the instruction stack;
   decoding and executing the next instruction;
   completing an iteration of all the instructions in the program loop when the decoding of one instruction indicates it is a loop-ending instruction; and
   decrementing the number of iterations remaining in the LCCR for the currently executing loop.

4. The system, as in claim 3, where the loop management process has the further step of determining that the number of iterations remaining in the LCCR indicates there are more iterations of the program loop to execute.

5. The system, as in claim 4, where there are more iterations of the program loop to execute and the loop management process:
   copies the loop back PC location for the currently executing loop into the PC; and
   fetches the next instruction.

6. The system, as in claim 4, where there are no more iterations of the currently executing loop to execute and the loop management process:
   decrements the loop level in the loop level register (LLEV),
   wherein the currently executing loop becomes a completed loop and the currently executing loop is one of the program loops containing the completed loop.

7. The system, as in claim 1, where the loop management process performs the following steps:
   fetching a next instruction from the instruction stack;
   decoding the next instruction as a MVLOOP instruction, the MVLOOP instruction having an initial iteration count for a nested loop;
   incrementing the loop level stored in the LLEV;
   setting the number of iterations remaining in the LCCR to the initial iteration count;
   storing the loop back PC location for the nested loop level in the LBPR table indexed by LLEV; and
   fetching the next instruction.

8. A computer system that manages execution of one or more programs with one or more loops, each loop having a loop level, the system comprising:
   one or more processors and one or more memories;
   a program counter (PC);
   one or more instruction stacks, each instruction stack having a plurality of instructions stored in one or more of the memories;

a loop level register (LLEV) that stores the loop level for a currently executing loop, the currently executing loop being one of the loops that one of the processors is currently executing;

a Loop-Back Program Counter Register (LBPR), the LBPR being a table of one or more Loop-Back Registers, each Loop-Back Register storing the loop level for a LBPR respective loop and a loop back PC location for the LBPR respective loop, the loop back PC location being a location in the instruction stack that stores a first body instruction of the LBPR respective loop, the first body instruction being the first instruction in the instruction stack after a MVLOOP associated with the currently executing loop;

a Loop Current Count Register table (LCCR), the LCCR having one or more LCCR Registers, each LCCR Register having the loop level for a LCCR respective loop and a number of iterations remaining to executed for the LCCR respective loop; and a loop management process comprising a skip level decision that:
  if the currently executing loop does not have a skip level indication, causing one of the CPUs to execute all of the one or more instructions of a program loop that has a program loop level equal to the currently executing loop level stored in the LLEV; and
  if the currently executing loop has the skip level indication, causing none of the instructions in the currently executing loop execute.

9. The system, as in claim 8, where the LLEV is decremented after decoding one of the instructions with a BE value indicating a last instruction.

10. The system, as in claim 8, where none of one or more nested loops nested within the currently executing loop are executed if the currently executing loop has the skip level indication.

11. The system, as in claim 10, where a set skip level indication for a loop level is set when a MVLOOP instruction is decoded, where
  if the loop level executing before the MVLOOP instruction does not have a skip level indication, then the loop level beginning with the MVLOOP instruction will have a skip level indication if and only if the iteration count of that MVLOOP instruction is zero, and where
  if the loop level executing before the MVLOOP instruction does have a skip level indication, then the loop level beginning with the MVLOOP instruction will have a skip level indication as well.

12. The system, as in claim 8, further comprising a check that a MVLOOP instruction is a Dynamic MVLOOP instruction that has a index field and the number of iterations of the loop beginning with that Dynamic MVLOOP instruction is determined by an entry in a table, where the entry is selected by the index.

13. The system, as in claim 12, where the MVLOOP instruction is a Dynamic MVLOOP instruction that has a PC target location and if the number of iterations of the loop beginning with that Dynamic MVLOOP instruction is zero, then the PC target location is stored in the PC.

14. A loop management process comprising the steps of:
  fetching an instruction from a program stack, the program stack having a plurality of instructions stored in one or more computer memories;
  decoding the instruction as a MVLOOP instruction, the MVLOOP instruction having an initial count;
  incrementing a loop level register (LLEV) to store a loop level for a currently executing loop, the currently executing loop being one of the loops that a first processor is currently executing;
  determining a loop back PC location for the currently executing loop from a Loop-Back Program Counter Register (LBPR), the LBPR being a table of one or more Loop-Back Registers, each Loop-Back Register associating a LBPR respective loop with a respective loop back PC location, the loop back PC location being a location in the instruction stack that stores a first body instruction of the currently executing loop, the first body instruction being the first instruction in the instruction stack after the MVLOOP instruction;
  storing the initial count in a LCCR Register, the LCCR Register being one of one or more registers in a Loop Current Count Register table (LCCR), the LCCR Register tracking a number of iterations remaining to executed for the currently execution loop;
  incrementing a Program Counter (PC), the PC pointing a next instruction in the instruction stack, the instruction being one of the instructions in the currently executing loop; and
  fetching the next instruction.

15. The process, as in claim 14, that decodes a last instruction, the last instruction having a BE value identifying the last instruction, after execution of the last instruction all the instructions of one iteration of the currently executing loop have been executed.

16. The process, as in claim 15, where the process:
  i. decrements the number of iterations remaining in the LCCR for the currently executing loop after the last instruction is executed; and
  ii. points the PC to the loop back PC location.

17. The process, as in claim 15, where if there are no number of iterations remaining, the process:
  decrements the LLEV;
  increments the PC; and
  fetches the next instruction.

18. The process, as in claim 14, further comprising a check of the MVLOOP instruction to determine if there is a skip level indication for the currently executing loop.

19. The process, as in claim 18, where if there is a skip level indication none the instructions in the currently executing loop are executed.

20. The process, as in claim 18, where if there is a skip level indication none of one or more nested loops nested within the currently executing loop are executed.

* * * * *